(12) United States Patent
Chen et al.

(10) Patent No.: US 8,561,195 B1
(45) Date of Patent: Oct. 15, 2013

(54) DETECTION OF MALICIOUS CODE BASED ON ITS USE OF A FOLDER SHORTCUT

(75) Inventors: Joseph Chen, Los Angeles, CA (US); Jing Rui, Chengdu (CN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/346,706

(22) Filed: Jan. 9, 2012

(51) Int. Cl.
 *G06F 21/24* (2006.01)
(52) U.S. Cl.
 USPC .................. 726/24; 726/22; 726/23
(58) Field of Classification Search
 None
 See application file for complete search history.

(56) References Cited

PUBLICATIONS

"How to Remove Virus Shortcut Harry Potter", 2010, Retrieved from the Internet on Feb. 11, 2013.*

* cited by examiner

*Primary Examiner* — Minh Dinh
(74) *Attorney, Agent, or Firm* — Bill Law Office; Jeffrey Brill (57) ABSTRACT

Malware is identified based on its use of a folder shortcut. Files are analyzed, in order to indentify files used to implement folder shortcuts. This can take the form of monitoring the creation of new files, or searching for existing files used to implement folder shortcuts. In response to detecting such a file, it can be determined that a folder shortcut exists. The contents of the file can also be analyzed, and the determination can be made in response to finding specific content indicative of a folder shortcut. The file analysis can also involve monitoring edits made to existing files indicative of folder shortcuts. In response to detecting such edits, the content being written can be analyzed, and in response to specific content being written, it can be determined that a folder shortcut exists.

20 Claims, 4 Drawing Sheets

FIG. 4

DETECTION OF MALICIOUS CODE BASED ON ITS USE OF A FOLDER SHORTCUT

TECHNICAL FIELD

This disclosure pertains generally to computer security, and more specifically to detecting persistent adware and other malicious code based on its use of a folder shortcut.

BACKGROUND

Persistent adware that displays unwanted advertisements to computer users can be a nuisance or worse. An example of persistent adware is the new StartPageAdware, which modifies a user's browser settings without permission so that an advertisement is displayed whenever the user opens the browser. Adware of this nature has become a common problem today. Yet, detecting and remediating persistent adware is a challenge for computer security applications (e.g., antivirus software and the like). Variants of persistent adware change frequently, making its detection very difficult.

One trick used by persistent adware to avoid detection is the use of a folder shortcut. A folder shortcut is a special case of a file shortcut. A file shortcut in Microsoft Windows® is a small file containing a link to a target object or the name of a target program. A shortcut file can also include parameters to be passed to the target upon activation. When a shortcut is selected, the target is invoked. Thus, the shortcut file acts as an alias for the target. A shortcut can be represented by its own icon, which can be placed on a desktop, in an application launcher panel such as the Windows start menu, or in the main menu of a desktop environment.

A folder shortcut is, as its name indicates, a shortcut that uses a folder as the alias for its target. In current versions of Windows, a folder shortcut is implemented as a folder containing two files: target.lnk and desktop.ini. The target.lnk file contains the target of the folder shortcut. As with any shortcut, this can be in the form of the name of an executable file (or a script or the like) to launch when the shortcut is selected, with parameters to pass to the executable. A destop.ini file is a text file used by Windows to customize the appearance and behavior of the folder in which it resides. In the case of a folder shortcut, desktop.ini contains some special values that configure the folder to act as a folder shortcut. From outside of an Explorer based browsing mechanism, such a folder simply looks like a standard folder containing the target.lnk and desktop.ini files. The folder and its contents can be seen from outside of Explorer, but in that context the folder does not act as an alias to the target specified in target.lnk. However, when accessed from Explorer, a folder configured in this manner acts as an alias for the target specified in target.lnk. In other words, the customized folder becomes a shortcut to the target.

As noted above, persistent adware can use a folder shortcut to avoid detection and removal. To do so, the adware can create a folder shortcut in which the target results in the display of an unwanted advertisement, and then trick the user into activating the shortcut. For example, the adware can create a folder shortcut that activates a legitimate web browser but passes it the URL of an advertisement. The adware then replaces the icon of the folder shortcut with the icon of the browser, so that when the user activates the browser the advertisement is displayed instead of the user's homepage. A folder shortcut can be used by other types of malware to display or run undesirable content other than advertisements, for example to display a phishing site or to launch a malicious program such as a computer virus. In any case, the adware or other malicious party can frequently change the specific folder used as the shortcut and/or its target. Furthermore, when accessed from outside of Explorer, the folder does not act as a shortcut, but simply appears to be a folder containing a few files. These factors make it difficult to detect and disable malicious programs such as adware that uses folder shortcuts.

It would be desirable to address these issues.

SUMMARY

Adware and other malware is identified based on its use of a folder shortcut on a computer. Files on the computer are analyzed in order to indentify files used to implement folder shortcuts (e.g., desktop.ini and target.lnk). In different embodiments, the file analysis can take different forms. For example, the creation of new files on the computer can be monitored. In this case, the creation of at least one file on the computer used to implement folder shortcuts is detected. In response to the detection, it can be determined that a folder shortcut is being created on the computer. In another embodiment, the contents of the created file is analyzed, and in response to finding specific content indicative of a folder shortcut in the created file, it is determined that a folder shortcut is being created on the computer.

The file analysis can also be in the form of monitoring edits made to existing files on the computer. In this case, edits being made to at least one file used to implement folder shortcuts are detected. In response to detecting such edits being made, the content being written by the edit is analyzed. In response to specific content being written to a file used to implement folder shortcuts, it can be determined that a folder shortcut is being created on the computer.

In another embodiment, the file analysis involves searching a file system on the computer, looking for files used to implement folder shortcuts, and detecting at least one file such on the computer. In response to the detection, it can be determined that a folder shortcut exists on the computer. The contents of the at least one file used to implement folder shortcuts can also be analyzed, in which case a determination of the existence of a folder shortcut on the computer can be made in response to finding specific content indicative of a folder shortcut.

In response to detecting a folder shortcut on the computer, additional steps can be taken to secure the computer against a process associated with the detected folder shortcut. For example, the process that created the detected folder shortcut can be adjudicated as being malicious. An application associated with the process that created the detected folder shortcut can be removed from the computer or reported to a centralized security server. The user of the computer can be warned concerning the detected folder shortcut. The folder shortcut can also be deleted, and the registry modified to restore the computer to its pre-folder shortcut system state.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
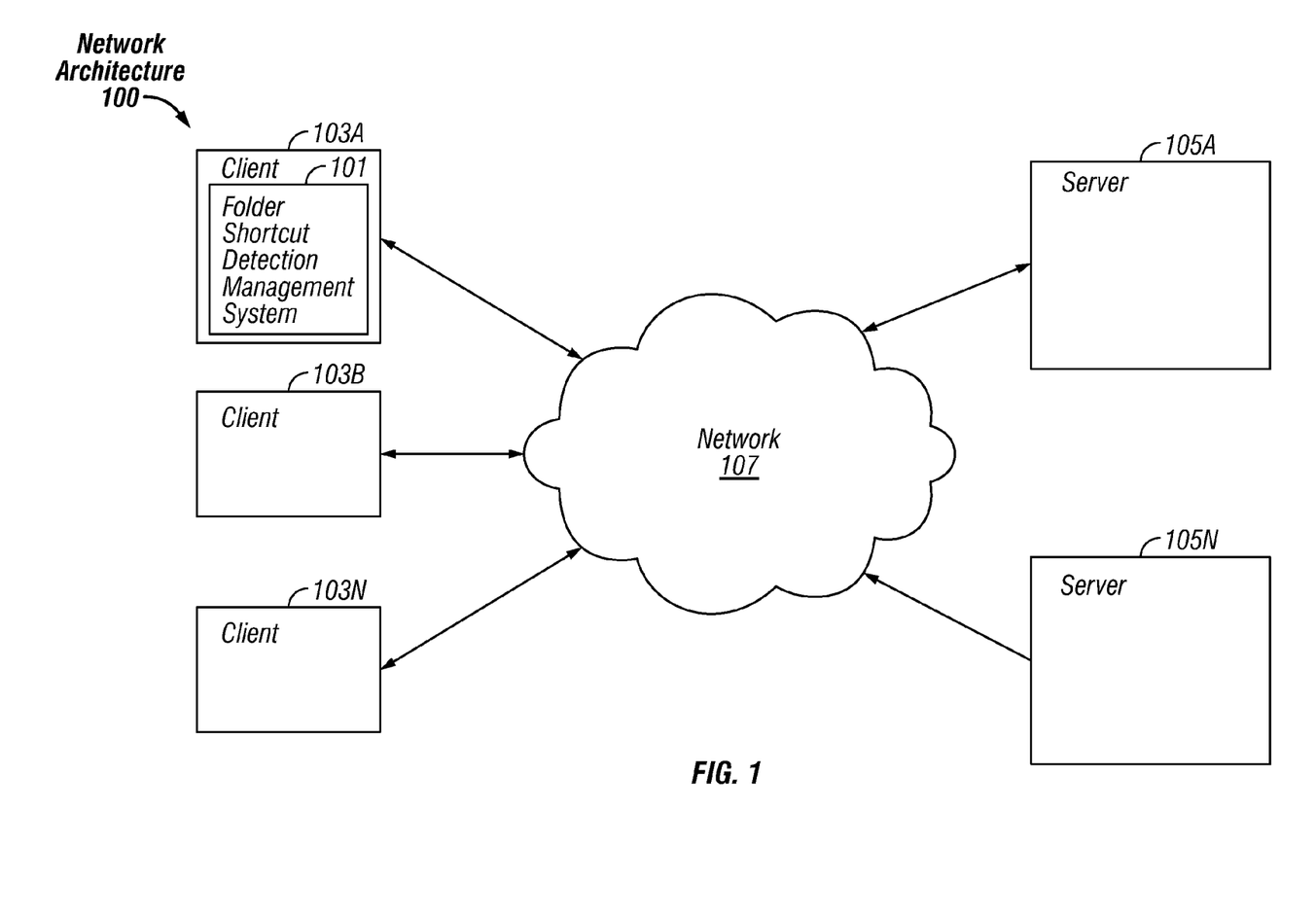
FIG. 1 is a block diagram of an exemplary network architecture in which a folder shortcut detection management system can be implemented, according to some embodiments.

FIG. 1 is a block diagram illustrating an exemplary network architecture 100 in which a folder shortcut detection management system 101 can be implemented. The illustrated network architecture 100 comprises multiple clients 103A, 103B and 103N, as well as multiple servers 105A and 105N. In FIG. 1, the folder shortcut detection management system 101 is illustrated as residing on client 103A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
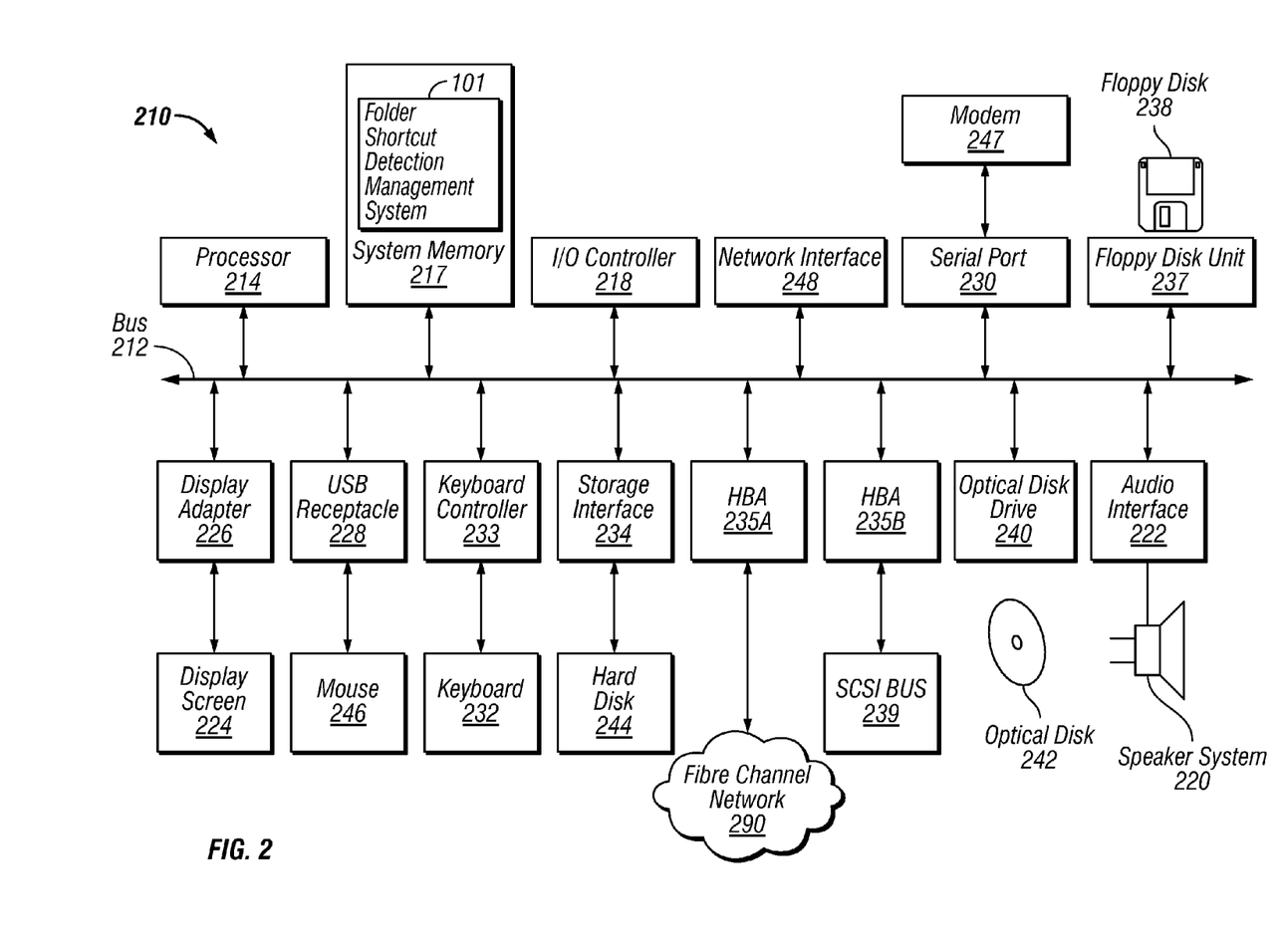
FIG. 2 is a block diagram of a computer system suitable for implementing a folder shortcut detection management system, according to some embodiments.

FIG. 2 is a block diagram of a computer system 210 suitable for implementing a folder shortcut detection management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the folder shortcut detection management system 101 is illustrated as residing in system memory 217. The workings of the folder shortcut detection management system 101 are explained in greater detail below in conjunction with FIGS. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
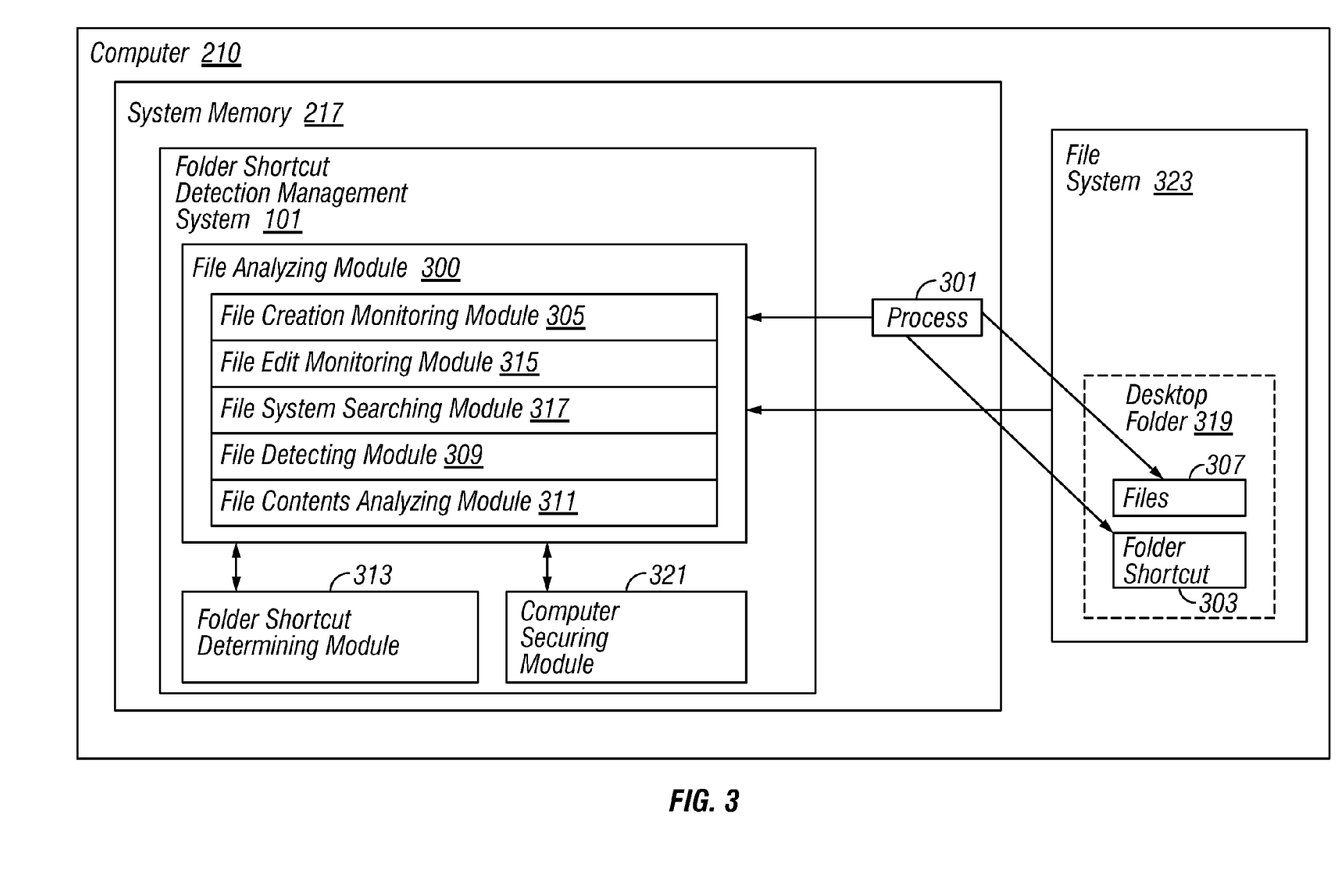
FIG. 3 is a block diagram of the operation of a folder shortcut detection management system, according to some embodiments.

FIG. 3 illustrates the operation of a folder shortcut detection management system 101, according to some embodiments. As described above, the functionalities of the folder shortcut detection management system 101 can reside on a client 103, a server 105, or be distributed between multiple computer systems 210, including within a cloud-based computing environment in which the functionality of the folder shortcut detection management system 101 is provided as a service over a network 107. It is to be understood that although the folder shortcut detection management system 101 is illustrated in FIG. 3 as a single entity, the illustrated folder shortcut detection management system 101 represents a collection of functionalities, which can be instantiated as a single or multiple modules as desired (an instantiation of specific, multiple modules of the folder shortcut detection management system 101 is illustrated in FIG. 3). It is to be understood that the modules of the folder shortcut detection management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the folder shortcut detection management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a folder shortcut detection management system 101 detects malicious code such as adware by its creation and/or use of a folder shortcut 303 on a user's computer 210. In different embodiments, the folder shortcut detection management system 101 detects the creation and/or use of folder shortcuts 303 in different ways, as described herein. More specifically, a file analyzing module 300 of the folder shortcut detection management system 101 analyzes files 307 on the computer 210, in order to indentify files 307 used to implement folder shortcuts 303. The analysis of files 307 can take different forms as described in more detail below.

In one embodiment, a file creation monitoring module 305 of the folder shortcut detection management system 101 monitors the creation of new files 307 on the computer 210. To do so, the file creation monitoring module 305 can filter or intercept operating system services for creating files 307. In one embodiment, the file creation monitoring module 305 is instantiated in the form of a file system filter driver. A file system filter driver intercepts requests made to a file system 323. The requests of interest to the file creation monitoring module 305 are requests to create new files 307. By intercepting requests to create new files 307 before the requests reach their intended target (i.e., the file system 323 file create routines) the filter driver can monitor, extend and/or replace functionally provided by the original target of the request. In other embodiments, the file creation monitoring module 305 monitors attempts to create new files 307 in other ways, for example by overwriting addresses of file system 323 create routines with the address of a system call wrapper that performs the monitoring.

In any case, through the monitoring of the creation of new files 307 on the computer 210, a file detecting module 309 of the folder shortcut detection management system 101 detects the creation of files 307 used to implement folder shortcuts 303 by any process 301 running on the computer 210. For example, as noted above, current versions of Windows use two files 307, named "desktop.ini" and "target.lnk" respectively, to implement folder shortcuts 303. By placing these two files 307 in a single folder, that folder can be configured as a folder shortcut 303. Thus, in one embodiment, the file detecting module 309 detects the creation of these files 307. It is to be understood that future versions of Windows might use one or more differently named file(s) 307 to implement folder shortcuts 303, and other operating systems that support folder shortcuts 303 might also use file(s) 307 with different names for this purpose. It is to be understood that in different embodiments, the file detecting module 309 detects the creation of whatever files 307 are used by the operating system (Windows or otherwise) to implement folder shortcuts 303, whatever the names of the files 307.

In one embodiment, where the creation of a file 307 named "desktop.ini" and a file 307 named "target.lnk" is detected in the same folder, in response a folder shortcut existence determining module 313 of the folder shortcut detection management system 101 determines that a folder shortcut 303 has been created. In other embodiments, the detection of the creation of these two files 307 is not considered enough to make such a determination by itself, and instead results in a file contents analyzing module 311 of the folder shortcut detection management system 101 analyzing the contents of desktop.ini. As noted above, the desktop.ini file 307 is used to customize the appearance and behavior of the folder in which it resides, and can thus be used for various legitimate purposes not associated with folder shortcuts 303. A file 307 named "target.lnk," while indicative of a folder shortcut 303, could also be used as a legitimate, file type shortcut.

For these reasons, in some embodiments, when the creation of a file 307 named "desktop.ini" is detected, the contents of the file 307 are analyzed to determine whether the file 307 contains the specific values used to implement a folder shortcut 303. In current versions of Windows, when desktop.ini is used for this purpose, it contains two specific lines (note that it can also contain other lines in addition to these two). A line with the value "[.ShellClassInfo]" indicates that the entries and assigned values appearing after this heading customize the folder's behavior. This line, by itself, has various legitimate uses in addition to its use in the configuration of folder shortcuts 303. When target.ini is being used to configure a folder as a folder shortcut 303, a line appearing under the heading [.ShellClassInfo] has the format "CLSID2={0AFACED1-E828-11D1-9187-B532F1E9575D}" which assigns the CLSID2 entry the value={0AFACED1-E828-11D1-9187-B532F1E9575D}, which points to a registry key that identifies the target.lnk file 307, which in turn contains the target of the folder shortcut 303. It is to be understood that in different versions of Windows and in different operating systems, the specific contents that is indicative of a folder shortcut 303 can vary, as well as the name of the file 307 in which the contents resides. For this reason, the specific file(s) 307 analyzed as well as the specific contents that the file contents analyzing module 311 looks for when analyzing files 307 can vary between embodiments.

As noted above, in response to the creation of these file(s) 307 and/or in response to their contents, a folder shortcut existence determining module 313 of the folder shortcut detection management system 101 can determine whether a folder shortcut 303 has been created. In one embodiment, the detection of a process 301 creating a desktop.ini file 307 with the contents described above is enough to determine that the process 301 implemented a folder shortcut 303. In another embodiment, this determination is made only in response to the desktop.ini file 307 with the above-described contents being created in a folder that also contains a target.lnk file 307. In one embodiment, the creation of a target.lnk file 307 in a folder containing a desktop.ini file 307 results in such a determination. In one embodiment, this is only the case where the desktop.ini file 307 in question contains the above-described contents.

In a manner similar to that of detecting the creation of new files 307, a file edit monitoring module 315 of the folder shortcut detection management system 101 can monitor the edits made to existing files 307 on the computer 210, in order to detect the editing of an existing desktop.ini file 307 so as to add the above-described contents indicative of a folder shortcut 303. As with the monitoring of the creation of new files 307, operating system services that write to existing files 307 can be filtered or intercepted, in order to detect the writing of the above-described values to an existing desktop.ini file 307, and in response the folder shortcut existence determining module 313 can determine whether a folder shortcut 303 has been created. In one embodiment, the detection of a process 301 editing a desktop.ini file 307 to add the above-described contents is enough to determine that the process 301 implemented a folder shortcut 303. In another embodiment, this determination is made only where the desktop.ini file 307 to which the above-described contents is added resides in a folder that contains a target.lnk file 307.

In yet another embodiment, a file system searching module 317 of the folder shortcut detection management system 101 searches the file system 323 on the computer 210, looking for folders that contain a desktop.ini file 307 and a target.lnk file 307. Where such a folder is located, the folder shortcut existence determining module 313 determines whether the folder comprises a folder shortcut 303. In one embodiment, the existence of the folder containing these files 307 is by itself considered enough to determine that the folder comprises a folder shortcut 303. In another embodiment, this is only determined if the desktop.ini file 307 in the folder contains the above-described content indicative of folder shortcuts 303.

As described above in the context of monitoring the creation of new files 307, the names of the file(s) 307 indicative of folder shortcuts 303 can vary, as well as the file contents so indicative. Thus, the files 307 and file contents of interest to the file edit monitoring module 315 and the file system searching module 317 can vary between embodiments.

The desktop folder 319 of the user's computer 210 can also be specially checked for files 307 that activate a folder shortcut 303, either directly or by activating other content (e.g., an executable image, a script, etc.) and passing it a folder shortcut 303 as a parameter. Extra attention is sometimes given to the desktop folder 319 because authors of persistent adware and other malware prefer to place links and such to their programs in highly visible places, so as to trick users into running them. For example, persistent adware often replaces an icon of the adware with the icon of the user's web browser, to trick the user into thinking s/he is launching the browser directly, when in fact selecting the icon activates a folder shortcut 303 that launches the browser and passes it the URL of an advertising or other unwanted page. Malware can perform such tricks not only with icons for link (e.g., .lnk) files 307, but also with icons for any type of file 307 capable of running content.

Therefore, in the embodiment in which the desktop folder 319 is scrutinized, the file creation monitoring module 305 can monitor the creation of files 307 on the desktop 319. When the file creation monitoring module 305 detects the creation of a new .lnk file 307 (or any other type of file 307 capable of running content) on the desktop 319, the file contents analyzing module 311 analyzes its contents, to determine whether it activates a folder shortcut 303. The file edit monitoring module 315 can also be used to detect when existing .lnk files 307 (or other types of files 307 capable of running content) on the desktop 319 are being edited. The file contents analyzing module 311 can then analyze the edits, to determine whether content to activate a folder shortcut 303 has been added to the existing file 307. Furthermore, the file system searching module 317 can search the desktop folder 319 for existing files 307 capable of running content, and the file contents analyzing module 311 can analyze their contents, to determine whether any such file 307 activates a folder shortcut 303. It is to be understood that in other embodiments, folders other than the desktop 319 can also be subject to such scrutiny as desired. Additionally, in some embodiments, specific files 307 can be specifically checked for folder shortcuts 303. For example, any links to web browsers (e.g., Internet Explorer, Mozilla Firefox, Google Chrome, etc.) on the desktop 319 (or elsewhere) can be analyzed to ensure that they are unmodified, and do not invoke a folder shortcut 303.

In any case, where the folder shortcut existence determining module 313 determines the existence of a folder shortcut 303, a computer securing module 321 of the folder shortcut detection management system 101 can perform different actions to secure the computer 210. For example, in one embodiment the folder shortcut 303 itself is considered to be sufficient evidence for the computer securing module 321 to convict the creating process 301 as being malicious. In other embodiments, rather than convicting the process 301 out-right, the computer securing module 321 uses the folder shortcut 303 as one of multiple factors in determining whether the process 301 is malicious, or to lower the reputation of the process 301. In response to detecting a folder shortcut 303, the computer securing module 321 can remove an application associated with the creating process 301 (e.g., the application that spawned the process 301) from the computer 210 and/or report the application to, for example, a central security server (not illustrated). The computer securing module 321 can warn the user of the computer 210 about the detected folder shortcut 303, e.g., via a popup box or other user interface component. Additionally, the computer securing module 321 can restore the computer 210 to its pre-folder shortcut 303 system state, which involves not only deleting the folder shortcut 303 itself, but also making changes to the registry (not illustrated).

Figure 4:
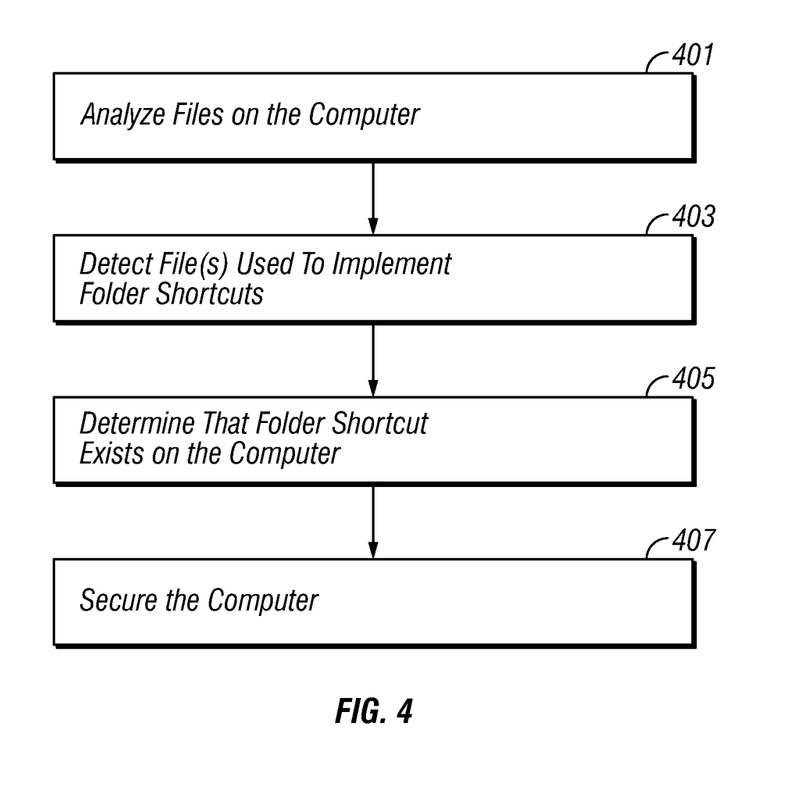
FIG. 4 is a flowchart of the operation of a folder shortcut detection management system, according to some embodiments.

FIG. 4 illustrates steps of the operation of the folder shortcut detection management system 101, according to some embodiments. The file analyzing module 300 analyzes 401 files 307 on the computer 210, in order to indentify files 307 used to implement folder shortcuts 303. The file detecting module 309 detects 403, on the computer 210, at least one file 307 used to implement folder shortcuts 303. The folder shortcut existence determining module 313 determines 405 that a folder shortcut 303 exists on the computer 210, in response at least to detecting the at least one file 307 used to implement folder shortcuts 303. The computer securing module 321 secures 407 the computer 210 against a process 301 associated with the detected folder shortcut 303, in response to determining that the folder shortcut 303 exists on the computer 210.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for identifying malware based on its use of a folder shortcut on a computer, the method comprising the steps of:
   automatically analyzing files on the computer, in order to identify files used to implement folder shortcuts, wherein automatically analyzing files on the computer further comprises automatically monitoring operating system services that create new files on the computer;
   automatically detecting creation of at least one file on the computer used to implement folder shortcuts;
   in response at least to automatically detecting creation of the at least one file used to implement folder shortcuts, automatically analyzing contents of the at least one file on the computer used to implement folder shortcuts;
   in response to the at least one file on the computer used to implement folder shortcuts comprising specific contents, automatically determining existence of a folder shortcut on the computer; and in response to automatically determining that the folder shortcut exists on the computer, performing at least one additional step to secure the computer against a process associated with the detected folder shortcut.

2. The method of claim 1 further comprising:

in response to a folder named desktop.ini and a folder named target.lnk residing in a single folder on the computer, automatically determining existence of a folder shortcut on the computer.

3. The method of claim 1 further comprising:

in response to a folder named desktop.ini containing content comprising 1) [.ShellClassInfo] and 2) CLSID2={0AFACED1-E828-11D1-9187-B532F1E9575D}, automatically determining existence of a folder shortcut on the computer.

4. The method of claim 1 wherein automatically analyzing files on the computer, in order to indentify files used to implement folder shortcuts, further comprises:

automatically examining files in a locations on the computer frequently used to start programs by users, automatically looking for files used to activate folder shortcuts.

5. The method of claim 1 wherein automatically performing at least one additional step to secure the computer against a process associated with the detected folder shortcut further comprises:

automatically adjudicating that a process that created the detected folder shortcut is malicious.

6. The method of claim 1 wherein automatically performing at least one additional step to secure the computer against a process associated with the detected folder shortcut further comprises automatically performing at least one step from a group of steps consisting of:

automatically removing an application associated with a process that created the detected folder shortcut from the computer;

automatically reporting an application associated with a process that created the detected folder shortcut to a second computer;

automatically warning a user of the computer concerning the detected folder shortcut; and automatically deleting the folder shortcut from the computer and modifying an operating system value of the computer to restore a pre-folder shortcut system state to the computer.

7. At least one non-transitory computer readable medium storing program code that, when loaded into computer memory and executed by a processor, performs the following steps for identifying malware based on its use of a folder shortcut on a computer:

analyzing files on the computer, in order to indentify files used to implement folder shortcuts wherein analyzing files on the computer further comprises performing a step from a group of steps consisting of: i) monitoring operating system services that create new files on the computer, ii) monitoring operating system services that make edits to existing files on the computer and iii) searching a file system on the computer looking for files used to implement folder shortcuts;

detecting, on the computer, at least one file used to implement folder shortcuts;

in response at least to detecting at least one file used to implement folder shortcuts, analyzing contents of the at least one file on the computer used to implement folder shortcuts;

in response to the at least one file on the computer used to implement folder shortcuts comprising specific contents, determining existence of a folder shortcut on the computer; and in response to determining that the folder shortcut exists on the computer, performing at least one additional step to secure the computer against a process associated with the detected folder shortcut.

8. The at least one non-transitory computer readable medium of claim 7 further comprising program code that, when loaded into computer memory and executed by a processor, performs the following step:

in response to a folder named desktop.ini and a folder named target.lnk residing in a single folder on the computer, determining existence of a folder shortcut on the computer.

9. The at least one non-transitory computer readable medium of claim 7 further comprising program code that, when loaded into computer memory and executed by a processor, performs the following step:

in response to a folder named desktop.ini containing content comprising 1) [.ShellClassInfo] and 2) CLSID2={0AFACED1-E828-11D1-9187-B532F1E9575D}, determining existence of a folder shortcut on the computer.

10. The at least one non-transitory computer readable medium of claim 7 further comprising program code that, when loaded into computer memory and executed by a processor, performs the following step:

examining files in a locations on the computer frequently used to start programs by users, looking for files used to activate folder shortcuts.

11. The at least one non-transitory computer readable medium of claim 7 wherein performing at least one additional step to secure the computer against a process associated with the detected folder shortcut further comprises:

adjudicating that a process that created the detected folder shortcut is malicious.

12. The at least one non-transitory computer readable medium of claim 7 wherein performing at least one additional step to secure the computer against a process associated with the detected folder shortcut further comprises performing at least one step from a group of steps consisting of:

removing an application associated with a process that created the detected folder shortcut from the computer;

reporting an application associated with a process that created the detected folder shortcut to a second computer;

warning a user of the computer concerning the detected folder shortcut; and deleting the folder shortcut from the computer and modifying an operating system value of the computer to restore a pre-folder shortcut system state to the computer.

13. A computer implemented method for identifying malware based on its use of a folder shortcut on a computer, the method comprising the steps of:

automatically analyzing files on the computer, in order to identify files used to implement folder shortcuts, wherein automatically analyzing files on the computer further comprises automatically monitoring operating system services that make edits to existing files on the computer;

automatically detecting edits being made to at least one file on the computer used to implement folder shortcuts;

in response to automatically detecting edits being made to the at least one file on the computer used to implement folder shortcuts, automatically analyzing content being written to the at least one file on the computer used to implement folder shortcuts;

in response to specific content being written to the at least one file on the computer used to implement folder shortcuts, automatically determining existence of a folder shortcut on the computer; and in response to automatically determining that the folder shortcut exists on the computer, performing at least one additional step to secure the computer against a process associated with the detected folder shortcut.

14. The method of claim 13 wherein automatically analyzing files on the computer, in order to indentify files used to implement folder shortcuts, further comprises:

automatically examining files in a locations on the computer frequently used to start programs by users, automatically looking for files used to activate folder shortcuts.

15. The method of claim 13 wherein automatically performing at least one additional step to secure the computer against a process associated with the detected folder shortcut further comprises:

automatically adjudicating that a process that created the detected folder shortcut is malicious.

16. The method of claim 13 wherein automatically performing at least one additional step to secure the computer against a process associated with the detected folder shortcut further comprises automatically performing at least one step from a group of steps consisting of:

automatically removing an application associated with a process that created the detected folder shortcut from the computer;

automatically reporting an application associated with a process that created the detected folder shortcut to a second computer;

automatically warning a user of the computer concerning the detected folder shortcut; and automatically deleting the folder shortcut from the computer and modifying an operating system value of the computer to restore a pre-folder shortcut system state to the computer.

17. A computer implemented method for identifying malware based on its use of a folder shortcut on a computer, the method comprising the steps of:

automatically analyzing files on the computer, in order to identify files used to implement folder shortcuts, wherein automatically analyzing files on the computer further comprises automatically searching a file system on the computer looking for files used to implement folder shortcuts;

automatically detecting at least one file on the computer used to implement folder shortcuts;

in response to automatically detecting the at least one file on the computer used to implement folder shortcuts, automatically analyzing contents of the at least one file on the computer used to implement folder shortcuts;

in response to the at least one file on the computer used to implement folder shortcuts comprising specific contents, automatically determining existence of a folder shortcut on the computer; and in response to automatically determining that the folder shortcut exists on the computer, performing at least one additional step to secure the computer against a process associated with the detected folder shortcut.

18. The method of claim 17 wherein automatically analyzing files on the computer, in order to indentify files used to implement folder shortcuts, further comprises:

automatically examining files in a locations on the computer frequently used to start programs by users, automatically looking for files used to activate folder shortcuts.

19. The method of claim 17 wherein automatically performing at least one additional step to secure the computer against a process associated with the detected folder shortcut further comprises:

automatically adjudicating that a process that created the detected folder shortcut is malicious.

20. The method of claim 17 wherein automatically performing at least one additional step to secure the computer against a process associated with the detected folder shortcut further comprises automatically performing at least one step from a group of steps consisting of:

automatically removing an application associated with a process that created the detected folder shortcut from the computer;

automatically reporting an application associated with a process that created the detected folder shortcut to a second computer;

automatically warning a user of the computer concerning the detected folder shortcut; and automatically deleting the folder shortcut from the computer and modifying an operating system value of the computer to restore a pre-folder shortcut system state to the computer.

* * * * *

UNITED STATES PATENT AND TRADEMARK OFFICE
CERTIFICATE OF CORRECTION

PATENT NO. : 8,561,195 B1
APPLICATION NO. : 13/346706
DATED : October 15, 2013
INVENTOR(S) : Joseph Chen and Jing Rui Page 1 of 1

It is certified that error appears in the above-identified patent and that said Letters Patent is hereby corrected as shown below:

In the Claims:

Col. 9, line 21, replace "a locations" with "locations"

Col. 10, line 30, replace "a locations" with "locations"

Col. 11, line 16, replace "a locations" with "locations"

Col. 12, line 20, replace "a locations" with "locations"

Signed and Sealed this
Tenth Day of December, 2013

Margaret A. Focarino
*Commissioner for Patents of the United States Patent and Trademark Office*